United States Patent [19]

Evers

[11] 4,115,367

[45] Sep. 19, 1978

[54] PERFLUOROALKYLENE ETHER BIBENZOXAZOLE POLYMERS

[75] Inventor: Robert C. Evers, Dayton, Ohio

[73] Assignee: The United States of America as represented by the Secretary of the Air Force, Washington, D.C.

[21] Appl. No.: 817,658

[22] Filed: Jul. 21, 1977

[51] Int. Cl.$^2$ ............................................. C08G 73/22
[52] U.S. Cl. .................................... 528/210; 528/211
[58] Field of Search ............................ 260/47 R, 61

[56] References Cited

U.S. PATENT DOCUMENTS 3,846,376  11/1974  Evers ..................................... 260/61
3,994,861  11/1976  Evers ..................................... 260/61

*Primary Examiner*—Lester L. Lee
*Attorney, Agent, or Firm*—Joseph E. Rusz; Cedric H. Kuhn

[57] ABSTRACT

Thermooxidatively and hydrolytically stable perfluoroalkylene ether bibenzoxazole polymers having improved viscoelastic properties are synthesized by the polycondensation of perfluoroalkylene ether bis(o-aminophenol) compounds with thioimidate esters derived primarily from tetrafluoroethylene oxide but end-capped with hexafluoropropylene oxide. Based on their lower glass transition temperature, the polymers have a very broad use temperature range which renders them particularly useful under severe environmental conditions encountered in aerospace elastomer applications such as seals and sealants.

7 Claims, No Drawings

PERFLUOROALKYLENE ETHER BIBENZOXAZOLE POLYMERS

RIGHTS OF THE GOVERNMENT

The invention described herein may be manufactured and used by or for the Government of the United States for all governmental purposes without the payment of any royalty.

FIELD OF THE INVENTION

This invention relates to perfluoroalkylene ether bibenzoxazole polymers possessing high thermooxidative and hydrolytic stability as well as superior low temperature viscoelastic properties. In one aspect it relates to a process for preparing the polymers.

BACKGROUND OF THE INVENTION

A great deal of research work has been conducted with the view of furnishing elastomeric polymers for various aerospace seal and sealant applications. In order for a polymer to fulfill completely the rigid requirements of such applications, it must be thermooxidatively and hydrolytically stable while having the capability of retaining its elastomeric properties at sub-zero temperatures. Previously, it has been possible to prepare polymers possessing two of these properties while one of the properties is less satisfactory than desired. Thus, in U.S. Pat. Nos. 3,846,376 and 3,994,861 polymers are disclosed by me that possess a broad use temperature range. However, the polymers are often hydrolytically unstable when exposed to humid conditions at elevated temperatures for extended periods of time. In my co-pending U.S. application Ser. No. 710,088, filed on July 30, 1976, and now issued as U.S. Pat. No. 4,064,109 polymers are disclosed that advance the art in meeting all three of the above-mentioned requirements. Thus, the polymers are thermally and hydrolytically stable and have a fairly low glass transition temperature (Tg). Since the Tg of a polymer is an indication of the temperature at which it retains its viscoelastic properties, there is still a need for thermally and hydrolytically stable polymers having even lower glass transition temperatures.

It is a principal object of this invention, therefore, to provide thermooxidatively and hydrolytically stable perfluoroalkylene ether bibenzoxazole polymers having improved low temperature viscoelastic properties.

Another object of the invention is to provide a method for synthesizing the polymers.

Other objects and advantages of the invention will become apparent to those skilled in the art upon consideration of the ensuing disclosure.

SUMMARY OF THE INVENTION

The present invention resides in a perfluoroalkylene ether bibenzoxazole polymer consisting essentially of recurring units having the following formula:

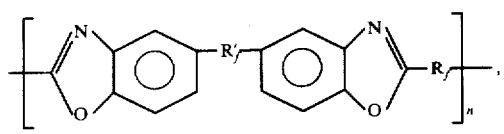

(I)

wherein $R_f'$ is $(CF_2)_2O(CF_2)_2O(CF_2)_2$, $(CF_2)_2O(CF_2)_5O(CF_2)_2$ or $(CF_2)_2O(CF_2)_5O(CF_2)_2O(CF_2)_2O(CF_2)_2$;

$R_f$ is

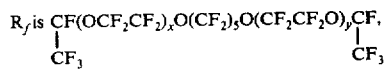

where $(x+y)$ equals 5 or 6, or

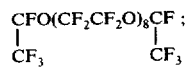

and $n$ is an integer equal to the number of recurring units. As broadly stated, $n$ is an integer equal to at least 2, preferably an integer in the range of 4 to 100. Alternatively, $n$ can be defined as an integer having a value such that the polymer has an inherent viscosity of at least 0.10, e.g., from about 0.10 to 1.0 when measured at 25° C as a 0.2 weight percent solution in hexafluoroisopropanol.

As seen from their structural formula, the polymers of this invention are characterized by the substantial absence of pendant trifluoromethyl ($CF_3$) groups along the polymer chain. This condition contributes to a high degree of chain flexibility and low glass transition temperature. However, a $CF_3$ group is attached to the carbon atom at the 2-position of each benzoxazole ring. These $CF_3$ groups shield the water-sensitive benzoxazole rings from attack by water. Because of their unique structure, the instant polymers possess high thermooxidative stability, outstanding hydrolytic stability, and low temperature viscoelastic properties superior to those of currently available polymeric materials.

In one embodiment the present invention lies in a method for preparing perfluoroalkylene ether bibenzoxazole polymers. According to the method, certain perfluoroalkylene ether bis(o-aminophenol) compounds are reacted in an inert atmosphere with certain perfluoroalkylene ether thioimidate esters. The polycondensation reaction is carried out in a solvent in the presence of glacial acetic acid. Examples of gases that can be employed to provide an inert atmosphere include nitrogen, helium and argon.

The monomers used and the polycondensation reaction involved in synthesizing the polymer are illustrated by the following equation:

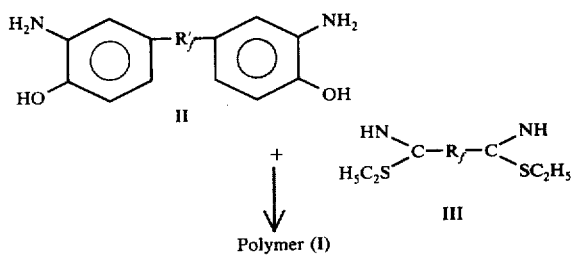

Polymer (I)

In the above equation, $R_f'$ and $R_f$ are as defined hereinbefore. From the equation it is seen that the source of the $R_f$ groups is the thioimidate esters (III) while the $R_f'$ groups are derived from the bis(o-aminophenol) compounds (II). In conducting the reaction, equimolar amounts of the reactants are utilized. The mole ratio of glacial acetic acid to the thioimidate ester is at least 2:1, e.g., 2 to 6:1. During the condensation reaction, the glacial acetic acid reacts with ammonia that is formed, thereby driving the reaction to completion.

The condensation reaction is carried out in a halogenated hydrocarbon which is a solvent for the monomers. It has been found to be necessary to employ hexafluoroisopropanol as the solvent in order to obtain high molecular weight polymers. The reaction temperature usually ranges from about 40° to 80° C. The reaction period depends upon the molecular weight that it is desired the polymer product to have. Usually, the reaction time ranges from about 7 to 20 days although shorter and longer periods can be used.

At the end of the reaction period, the polymer is recovered and purified by a general procedure that is conventionally followed in solution polymerization processes. Thus, the reaction mixture is poured into a non-solvent for the polymer, e.g., into an alcohol such as methanol, thereby causing the polymer to precipitate from solution. The precipitated polymer is then separated from the liquid by any suitable means, such as by decantation or filtration. After washing the separated polymer with an alcohol, it is dried at reduced pressure for 1 to 5 hours at a temperature ranging from 100° to 200° C. It is often desirable to redissolve the separated and washed polymer in a solvent, such as trichlorotrifluoroethane (Freon 113), after which it is again precipitated from solution by pouring the solution into methanol. After separation of the precipitated polymer, it is again washed with methanol and then dried under a vacuum.

The following bis(o-aminophenol) compounds (II) are employed in synthesizing the polymers of this invention:

(1) 1,8-bis(3-amino-4-hydroxyphenyl)perfluoro-3,6-dioxaoctane, (2) 1,11-bis(3-amino-4-hydroxyphenyl)perfluoro-3,9-dioxaundecane, and (3) 1,17-bis(3-amino-4-hydroxyphenyl)perfluoro-3,6,9,15-tetraoxaheptadecane.

The above-listed compounds can also be represented by formula (II) above. In this formula $R_f'$ is one of the following groups:

(1) $(CF_2)_2O(CF_2)_2O(CF_2)_2$, (2) $(CF_2)_2O(CF_2)_5O(CF_2)_2$, or (3) $(CF_2)_2O(CF_2)_5O(CF_2)_2O(CF_2)_2O(CF_2)_2$.

The preparation of 1,8-bis(3-amino-4-hydroxyphenyl)perfluoro-3,6-dioxaoctane is described hereinafter in Example I. The preparation of 1,11-bis(3-amino-4-hydroxyphenyl)perfluoro-3,9-dioxaundecane is described in U.S. Pat. No. 3,903,166 while the preparation of 1,17-bis(3-amino-4-hydroxyphenyl)perfluoro-3,6,9,15-tetraoxaheptadecane is described in U.S. Pat. No. 4,005,142. The disclosures of these two issued patents are incorporated herein by reference.

The thioimidate esters used in preparing the polymers of this invention correspond to formula (III) above in which $R_f'$ is as indicated. The synthesis of these compounds is described in my copending patent application Ser. No. 817,657, filed on July 21, 1977, the disclosure of which is incorporated herein by reference.

As disclosed in my copending application, the thioimidate esters (III) are synthesized in accordance with the reaction represented by the following equation:

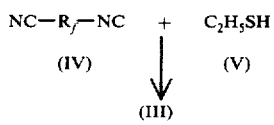

The synthesis is carried out by reacting an excess of ethanethiol (V) with the perfluoroalkylene ether dinitrile (IV) in the presence of a catalytic amount of triethylamine. The amount of catalyst used can vary within rather broad limits, but it usually ranges from about 0.05 to 0.30 mole per mole of dinitrile. The mole ratio of ethanethiol to dinitrile is at least 2 to 1, e.g., 2 to 150:1. In addition to being a reactant, the ethanethiol functions as the reaction medium.

In preparing the thioimidate esters, it is usually preferred to add the dinitrile to a solution of triethylamine in ethanethiol. Upon completion of the addition, the resulting mixture is maintained at a temperature ranging from about room temperature to reflux temperature for a period of about 6 to 84 hours. In one procedure the mixture is allowed to remain at room temperature for about 24 to 72 hours after which it is refluxed for about 4 to 10 hours. At the end of the reaction period, the thioimidate ester product is recovered by vacuum distillation after distilling off the triethylamine and ethanethiol at atmospheric pressure.

The perfluoroalkylene ether dinitriles used in synthesizing the thioimidate esters can be prepared from perfluoroalkylene ether diacid fluorides by esterification, amidation and dehydration with phosphorus pentoxide. The procedure for preparing the dinitriles is described in more detail in U.S. Pat. No. 3,317,484 while U.S. Pat. Nos. 3,250,806, 3,250,807 and 3,960,814 disclose the preparation of diacid fluorides.

A more comprehensive understanding of the invention can be obtained by referring to the following illustrative examples which are not intended, however, to be unduly limitative of the invention.

EXAMPLE I

Preparation of 1,8-Bis(3-amino-4-hydroxyphenyl)perfluoro-3,6-dioxaoctane (a) 1,8-Diiodoperfluoro-3,6-dioxaoctane Potassium fluoride (55 g, 1.0 mole) was charged to a Fischer-Porter pressure bottle containing a magnetic stirring bar and was dried overnight at 200° C under vacuum. After the bottle was cooled at room temperature, tetraglyme (200 ml) was added and the mixture was stirred for a few minutes under vacuum. The reaction vessel was then cooled in a dry ice-acetone bath and oxalyl fluoride (45 g, 0.48 mole) was charged through a vacuum manifold. The mixture was allowed to warm to ambient temperature and was stirred for 1 hour. After the reaction vessel was cooled to −78° C, iodine monochloride (50 ml, 1.0 mole) was added through a syringe and the system was evacuated. The stirred reaction mixture was allowed to reach room temperature and tetrafluoroethylene was pressured in at 35 psi. The reaction was terminated after several days when the deep red color of the reaction mixture had turned to a light yellow color. Excess tetrafluoroethylene was then vented off and the reaction mixture was poured into water. Sodium bisulfite solution was used to destroy excess iodine and the product separated as the heavy phase. The crude product was distilled in an Oldershaw column to give 94 g (16% yield) diiodide, bp 60°–61° C/13 mm. The structure was verified by infrared and nuclear magnetic resonance spectroscopy.

(b) 1,8-Bis(4-hydroxyphenyl)perfluoro-3,6-dioxaoctane

To a solution of 4-iodophenyl acetate (26.8 g, 0.102 mole) and 1,8-dioodoperfluoro-3,6-dioxaoctane (20.0 g, 0.034 mole) in 125 ml of N,N-dimethylformamide was added copper bronze (17.3 g, 0.273 g atom). This slurry was stirred under nitrogen at 105°–110° C for 96 hours. The cooled reaction mixture was added to a stirred mixture of 200 ml of ether and 300 ml of water. The cuprous salts and excess copper were filtered off and washed with ether on the frit. The ether layer was then washed repeatedly with water until free from the reaction solvent. The ethereal solution was evaporated to dryness to give 23 g of brown oil which was refluxed in 20 ml of acetic anhydride for 40 minutes. The excess acetic anhydride was distilled off and the residue was distilled under reduced pressure to give 13.5 g of 1,8-bis(4-acetoxyphenyl)perfluoro-3,6-dioxaoctane, bp 158°–161° C/0.005 mm. This water-white oil was refluxed for 40 minutes in a solution of 22 ml of concentrated hydrochloric acid in 225 ml of methanol. The solvent was evaporated under reduced pressure and the resultant tan residue was taken up in a liter of hexane. This solution was treated with charcoal, filtered, and cooled to give 8.20 g (46% yield) of light pink crystals, mp 118°–120° C.

Analysis Calc'd: C,41.71; H,1.95. Found: C,41.46; H,1.76.

Molecular weight (mass spectroscopy): Calc'd: 518. Found: 518.

(c) 1,8-Bis(3-nitro-4-hydroxyphenyl)perfluoro-3,6-dioxaoctane

To a solution of 1,8-bis(4-hydroxyphenyl)perfluoro-3,6-dioxaoctane (8.00 g, 0.015 mole) in 125 ml glacial acetic acid was added 12.50 ml of concentrated nitric acid (0.197 mole). The pale yellow solution was stirred at 40°–46° C for 5 hours with care being taken to control any initial exotherms. The solution took on a deep red color which faded to pale orange as the reaction progressed to completion. The cooled reaction mixture was added to a liter of ice water and the product extracted twice with 500 ml portions of ether. The combined ether solutions were washed repeatedly with water and finally with dilute sodium bicarbonate solution. The ethereal solution was dried over anhydrous magnesium sulfate and then reduced in volume to 8.1 g of brown oil which was taken up in hot heptane. Distillation yielded 6.40 g (68% yield) of pale yellow product, bp 165°–171° C/0.06 mm.

Analysis Calc'd: C,35.42; H,1.65; N,4.59. Found: C,35.42; H,0.96; N,4.77.

Molecular weight (mass spectroscopy): Calc'd: 608. Found: 608.

(d) 1,8-Bis(3-amino-4-hydroxyphenyl)perfluoro-3,6-dioxaoctane

A solution of 1,8-bis(3-nitro-4-hydroxyphenyl)perfluoro-3,6-dioxaoctane (6.10 g, 0.010 mole) in 185 ml of ethanol was deoxygenated by passing nitrogen through the boiling solution for 14 minutes. Concentrated hydrochloric acid (37 ml, 0.44 mole) and 10% Pd/C(0.75 g) were added to the cooled solution and the catalytic reduction was run overnight at room temperature and 50 psi of hydrogen. The catalyst was filtered off and the water white solution reduced to dryness under water aspirator pressure. The light tan residue (6.1 g) was slurried in a water-ether mixture. After careful neutralization with solid sodium bicarbonate, the product dissolved in the ether layer, which was washed several times with water, dried over magnesium sulfate and evaporated to dryness. The soluble portion of the filtrate was taken up in 6 liters of boiling heptane, the solution treated with charcoal and reduced in volume to 3 liters to give upon cooling 2.9 g (53% yield) of slightly off-white product, mp 150°–152° C.

Analysis Calc'd: C,39.43; H,2.21; N,5.11. Found: C,39.67; H,1.66; N,4.86.

Molecular weight (mass spectroscopy): Calc'd: 548. Found: 548.

EXAMPLE II

A series of runs was carried out in which perfluoroalkylene ether bibenzoxazole polymers were prepared in accordance with the reaction represented by the following equation:

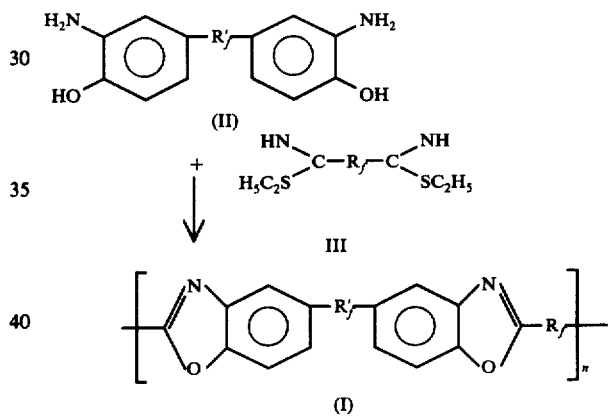

Essentially the same procedure was followed in conducting the runs. Thus, redistilled hexafluoroisopropanol (HFIP) (solvent) was added to an equimolar mixture of a bis(o-aminophenol) compound (II) and a thioimidate ester (III). To the resultant solution there was added glacial acetic acid in an amount such that the mole ratio of acetic acid to thioimidate ester was about 4 to 1. The polycondensation reaction was allowed to proceed with stirring under nitrogen at 55° to 60° C during the reaction period. At the end of the reaction period, the viscous amber solution was poured into 100 ml of methanol. The supernatant liquid was decanted and the swollen, tacky polymer was redissolved in 5 ml of Freon 113. The polymer solution was filtered and added dropwise to 150 ml of vigorously stirred methanol. Washing of the precipitated polymer with additional portions of methanol followed by drying for about 4 hours at about 140° C under a vacuum gave high yields of rubbery polymer.

Listed below in Table I are the $R_f'$ and $R_f$ groups of the monomers used and of the polymer products obtained in the runs.

TABLE I

| Run No. | $R_f'$ | $R_f$ |
|---|---|---|
| 1 | $(CF_2)_2O(CF_2)_2O(CF_2)_2$ | $CFO(CF_2CF_2O)_8CF$ <br> $\|\quad\quad\quad\quad\quad\quad\;\;\|$ <br> $CF_3\quad\quad\quad\quad\;\;CF_3$ |
| 2 | $(CF_2)_2O(CF_2)_5O(CF_2)_2$ | $CF(OCF_2CF_2)_xO(CF_2)_5O(CF_2CF_2O)_yCF$ <br> $\|\quad\quad\quad\quad\quad\quad\quad\quad\quad\quad\quad\quad\;\;\|$ <br> $CF_3\quad\quad\quad\quad\quad\quad\quad\quad\quad\quad\quad CF_3$ <br> $(x + y) = 5$ |
| 3 | $(CF_2)_2O(CF_2)_5O(CF_2)_2$ | $CF(OCF_2CF_2)_xO(CF_2)_5O(CF_2CF_2O)_yCF$ <br> $\|\quad\quad\quad\quad\quad\quad\quad\quad\quad\quad\quad\quad\;\;\|$ <br> $CF_3\quad\quad\quad\quad\quad\quad\quad\quad\quad\quad\quad CF_3$ <br> $(x + y) = 6$ |
| 4 | $(CF_2)_2O(CF_2)_5O(CF_2)_2$ | $CFO(CF_2CF_2O)_8CF$ <br> $\|\quad\quad\quad\quad\quad\quad\;\;\|$ <br> $CF_3\quad\quad\quad\quad\;\;CF_3$ |
| 5 | $(CF_2)_2O(CF_2)_5O(CF_2)_2O(CF_2)_2O(CF_2)_2$ | $CF(OCF_2CF_2)_xO(CF_2)_5O(CF_2CF_2O)_yCF$ <br> $\|\quad\quad\quad\quad\quad\quad\quad\quad\quad\quad\quad\quad\;\;\|$ <br> $CF_3\quad\quad\quad\quad\quad\quad\quad\quad\quad\quad\quad CF_3$ <br> $(x + y) = 6$ |
| 6 | $(CF_2)_2O(CF_2)_5O(CF_2)_2O(CF_2)_2O(CF_2)_2$ | $CFO(CF_2CF_2O)_8CF$ <br> $\|\quad\quad\quad\quad\quad\quad\;\;\|$ <br> $CF_3\quad\quad\quad\quad\;\;CF_3$ |

In Table II below, there are listed conditions used in the runs as well as inherent viscosities of the polymer products.

TABLE II

| Run No. | Time, hours | Reaction Concentration,[1] % monomer | $\eta$inh,[2] dl/g |
|---|---|---|---|
| 1 | 456 | 36.0 | 0.27 |
| 2 | 312 | 96.5 | 0.27 |
| 3 | 192 | 60.0 | 0.38 |
| 4 | 288 | 50.5 | 0.30 |
| 5 | 264 | 38.5 | 0.25 |
| 6 | 384 | 56.5 | 0.40 |

[1] Weight percent of total amount of monomers in solution in HFIP
[2] Inherent viscosity measured at 25° C as a 0.2 weight percent solution in HFIP In Table III below there are listed the glass transition temperatures (Tg) and the results of the elemental analysis of the polymer products.

TABLE III

| Run No. | Tg –° C[1] | Analysis - Calc'd (Found) | | |
|---|---|---|---|---|
| | | C | H | N |
| 1 | −39 | 28.09 | 0.35 | 1.64 |
| | | (28.22) | (0.08) | (1.75) |
| 2[2] | −35 | 28.37 | 0.35 | 1.57 |
| | | (28.10) | (0.19) | (2.00) |
| 3 | −38 | 27.90 | 0.32 | 1.48 |
| | | (27.98) | (0.02) | (1.67) |
| 4 | −37 | 27.76 | 0.33 | 1.51 |
| | | (27.95) | (0.03) | (1.65) |
| 5 | −44 | 27.79 | 0.28 | 1.54 |
| | | (27.25) | (0.13) | (1.54) |
| 6 | −47 | 26.98 | 0.29 | 1.34 |
| | | (27.05) | (0.12) | (1.44) |

[1] Determined by differential scanning calorimetry, $\Delta T = 20°$ C/min.
[2] Thermogravimetric analysis indicated onset of breakdown in air at 400° C with a 30% weight loss at 500° C.

EXAMPLE III

A series of hydrolytic tests was conducted at 95 percent relative humidity and 200° F on the polymers prepared in runs 2 and 4 of Example I. Control tests were carried out on bibenzoxazole polymers other than those disclosed herein. The polymers had structural formula (I) shown in Example I. The $R_f'$ and $R_f$ groups of the polymers used in the tests are listed below in Table IV.

TABLE IV

| Test No. | $R_f'$ | $R_f$ |
|---|---|---|
| 1(Control) | $(CF_2)_2O(CF_2)_5O(CF_2)_2$ | $CF_2(OCF_2CF_2)_xO(CF_2)_5O(CF_2CF_2O)_yCF_2$ <br> $(x + y) = 6$ |
| 2(Control) | $(CF_2)_2O(CF_2)_5O(CF_2)_2$ | $CF_2(OCF_2CF_2)_xO(CF_2)_5O(CF_2CF_2O)_yCF_2$ <br> $(x + y) = 5$ |
| 3(Control) | $(CF_2)_2O(CF_2)_5O(CF_2)_2$ | $CF(OCF_2CF)_xO(CF_2)_5O(CFCF_2O)_yCF$ <br> $\|\quad\quad\;\;\|\quad\quad\quad\quad\quad\quad\;\;\|\quad\quad\;\;\|$ <br> $CF_3\;\;CF_3\quad\quad\quad\quad\;\;CF_3\;\;CF_3$ <br> $(x + y) = 5$ |
| 4(Control) | $(CF_2)_2O(CF_2)_5O(CF_2)_2O(CF_2)_2O(CF_2)_2$ | $CF(OCF_2CF)_xO(CF_2)_5O(CFCF_2O)_yCF$ <br> $\|\quad\quad\;\;\|\quad\quad\quad\quad\quad\quad\;\;\|\quad\quad\;\;\|$ <br> $CF_3\;\;CF_3\quad\quad\quad\quad\;\;CF_3\;\;CF_3$ <br> $(x + y) = 5$ |
| 5(Run 2) | $(CF_2)_2O(CF_2)_5O(CF_2)_2$ | $CF(OCF_2CF_2)_xO(CF_2)_5O(CF_2CF_2O)_yCF$ <br> $\|\quad\quad\quad\quad\quad\quad\quad\quad\quad\quad\quad\quad\;\;\|$ <br> $CF_3\quad\quad\quad\quad\quad\quad\quad\quad\quad\quad\quad CF_3$ <br> $(x + y) = 5$ |
| 6(Run 4) | $(CF_2)_2O(CF_2)_5O(CF_2)_2$ | $CF(OCF_2CF_2)_8OCF$ <br> $\|\quad\quad\quad\quad\quad\quad\;\;\|$ <br> $CF_3\quad\quad\quad\quad\;\;CF_3$ |

The results obtained in the tests are set forth below in Table V.

TABLE V

| Test No. | Hrs | Absorption Infrared[1] tion at 1740 cm$^{-1}$ | Original Tg, °C | Final Tg, °C | Original η inh-dl/g | Final η inh-dl/g |
|---|---|---|---|---|---|---|
| 1 | 364 | Slight absorption after 24 hrs; stronger absorption after 48 hrs as well as absorption at 1710 cm$^{-1}$. Very strong absorption at 1710 cm$^{-1}$ after 70 hrs. | −52 | [2] | 0.24 | [2] |
| 2 | 364 | Very strong absorption at 1710 cm$^{-1}$ after 170 hrs. | −45 | [2] | 0.26 | [2] |
| 3 | 654 | Initial very weak absorption did not change upon exposure. | −20 | −23 | 0.25 | 0.23 |
| 4 | 654 | " | −34 | −33 | 0.35 | 0.31 |
| 5 | 1010 | Initial very weak absorption increased very slightly after 330 hrs. No additional increase with longer exposure. | −35 | −32 | 0.27 | 0.21 |
| 6 | 726 | Initial very weak abosrption increased slightly over the period of the test. | −37 | −36 | 0.30 | 0.23 |

[1]Appearance of these bands is evidence of hydrolysis of the benzoxazole rings.
[2]Could not be measured because of the degraded condition of the polymer.

The foregoing data demonstrate that the polymer products of this invention are thermally stable, elastomeric materials possessing a high degree of hydrolytic stability. Of particular importance is the significantly lower glass transition temperatures of the instant polymers as compared to prior art polymers. Thus, referring to Table V, it is seen that the polymers of control test 3 and invention test 5 contained the same number of ether atoms, differing structurally only as to the presence of pendant CF$_3$ groups. However, the polymer of test 5 exhibited a significantly lower glass transition temperature which is indicative of superior low temperature viscoelastic properties and broader use temperature range. The combination of thermooxidative and hydrolytic stability as well as improved low temperature viscoelastic properties render the present polymers particularly suitable for use under severe environmental conditions in elastomer applications such as seals, sealants, and the like.

As will be evident to those skilled in the art, modifications of the present invention can be made in view of the foregoing disclosure without departing from the spirit and scope of the invention

I claim:

1. A perfluoroalkylene ether bibenzoxazole polymer consisting essentially of recurring units having the following formula:

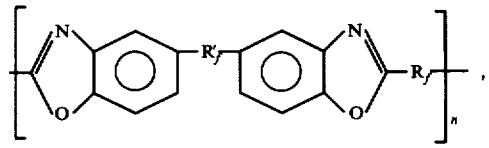

wherein R$_f'$ is (CF$_2$)$_2$O(CF$_2$)$_2$O(CF$_2$)$_2$, (CF$_2$)$_2$O(CF$_2$)$_5$O(CF$_2$)$_2$ or (CF$_2$)$_2$O(CF$_2$)$_2$O(CF$_2$)$_5$O(CF$_2$)$_2$O(CF$_2$)$_2$;

$$\text{R}_f \text{ is } \underset{\text{CF}_3}{\text{CF}}(\text{OCF}_2\text{CF}_2)_x\text{O}(\text{CF}_2)_5\text{O}(\text{CF}_2\text{—CF}_2\text{O})_y\underset{\text{CF}_3}{\text{CF}},$$

where (x+y) equals 5 or 6, or $$\underset{\text{CF}_3}{\text{CFO}}(\text{CF}_2\text{CF}_2\text{O})_8\underset{\text{CF}_3}{\text{CF}};$$

and n is an integer equal to at least 2.

2. The polymer according to claim 1 in which R$_f'$ is (CF$_2$)$_2$O(CF$_2$)$_2$O(CF$_2$)$_2$ and R$_f$ is $$\underset{\text{CF}_3}{\text{CFO}}(\text{CF}_2\text{CF}_2\text{O})_8\underset{\text{CF}_3}{\text{CF}}.$$

3. The polymer according to claim 1 in which R$_f'$ is (CF$_2$)$_2$O(CF$_2$)$_5$O(CF$_2$)$_2$ and R$_f$ is

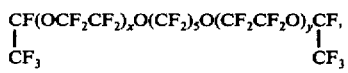
where $(x+y)$ equals 5.
4. The polymer according to claim 1 in which $R_f'$ is $(CF_2)_2O(CF_2)_5O(CF_2)_2$ and $R_f$ is
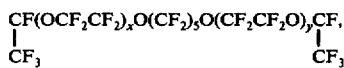
where $(x+y)$ equals 6.
5. The polymer according to claim 1 in which $R_f'$ is $(CF_2)_2O(CF_2)_5O(CF_2)_2$ and $R_f$ is
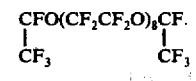
6. The polymer according to claim 1 in which $R_f'$ is $(CF_2)_2O(CF_2)_5O(CF_2)_2O(CF_2)_2O(CF_2$ and $R_f$ is
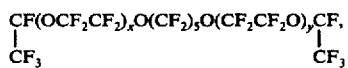
where $(x+y)$ equals 6.
7. The polymer according to claim 1 in which $R_f'$ is $(CF_2)_2O(CF_2)_5O(CF_2)_2O(CF_2)_2O(CF_2)_2$ and $R_f$ is
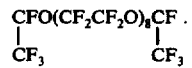
* * * * *